United States Patent [19]

Meyer et al.

[11] 4,218,516

[45] Aug. 19, 1980

[54] PIGMENT FOR BLOCKING TANNIN MIGRATION

[75] Inventors: Victor E. Meyer; Rex R. Stevens, both of Midland, Mich.

[73] Assignee: The Dow Chemical Company, Midland, Mich.

[21] Appl. No.: 6,622

[22] Filed: Jan. 26, 1979

[51] Int. Cl.[2] .......................... B32B 33/00; B32B 21/04; B32B 21/12

[52] U.S. Cl. .......................... 428/537; 106/288 B; 106/306; 156/90; 427/325; 427/397; 427/408; 427/419.1; 428/539; 428/541; 428/921

[58] Field of Search .................. 427/397, 408, 419 R, 427/325; 106/288 B, 306; 428/537, 539, 541, 921; 156/90

[56] References Cited

U.S. PATENT DOCUMENTS

| | | | |
|---|---|---|---|
| 3,494,878 | 2/1970 | Harren et al. | 428/461 X |
| 3,756,850 | 9/1973 | Story | 428/537 X |
| 3,778,304 | 12/1973 | Thompson | 428/921 |
| 3,808,037 | 4/1974 | Story | 428/539 |
| 3,847,857 | 11/1974 | Haag et al. | 260/29.6 RW |
| 3,852,087 | 12/1974 | Nordyke et al. | 106/292 X |
| 3,900,619 | 8/1975 | Lalk et al. | 427/408 |
| 3,900,620 | 8/1975 | Gilman et al. | 427/408 |
| 3,919,145 | 11/1975 | Eckhoff | 260/22 TN |
| 4,072,786 | 2/1978 | Hinsche et al. | 428/537 |
| 4,145,242 | 3/1979 | Chow | 428/537 |

FOREIGN PATENT DOCUMENTS

| | | |
|---|---|---|
| 1080468 | 8/1967 | United Kingdom . |

*Primary Examiner*—Harold Ansher
*Attorney, Agent, or Firm*—Joyce P. Hill

[57] ABSTRACT

A process for inhibiting the staining of film-forming finishes applied to a tannin-containing wood substrate comprises applying to the wood substrate, prior to or concurrently with the surface film, an aqueous formulation containing a stain-inhibiting amount of magnesium hydroxide having a high surface area, thereby forming a leach-resistant magnesium hydroxide-tannin complex.

6 Claims, No Drawings

PIGMENT FOR BLOCKING TANNIN MIGRATION

BACKGROUND OF THE INVENTION

When protective film-forming finishes including paints, lacquers, and varnishes are applied to wood having a high content of water-soluble tannin, such as redwood, cedar or mahogany, the tannin often bleeds or migrates into the surface film, thereby causing a dark stain in the film. When additional coats of a protective film are applied, the stain often bleeds through and continues to be visible. Thus, tannins provide excellent anti-microbial properties in many leaf, bark and root materials but simultaneously cause undesirable staining problems in film-forming wood finishes.

Various processes of inhibiting tannin migration in tannin-containing wood substrates are known. Sulfonium compounds have been disclosed as useful in blocking tannin migration in wood substrates (U.S. Pat. Nos. 3,636,052; 3,660,431 and 3,900,619). Highly cross-linked ion exchange resins have been incorporated into aqueous coating compositions applied to cedar and redwood type substrates (U.S. Pat. No. 3,494,878). Aqueous solutions of nonlinear polyalkylenimines or linear, partially deacylated poly(N-acyl)alkylenimines have also been used to inhibit tannin migration in wood substrates (U.S. Pat. Nos. 4,075,394 and 4,104,228 respectively). Amphoteric compounds of alumina, titania, zirconium, silica or zinc have been incorporated into certain composite pigments to inhibit the migration of water-soluble tannins through a paint film (U.S. Pat. No. 3,852,087).

The lumber industry, concerned with the problem of transit staining on lumber, is taught to use an essentially atinctorial (i.e., neutral with respect to color) slowly leachable alkaline earth metal base which include oxides, carbonates, phosphates, hydroxides, borates, borosilicates, and hydrates of the alkaline earth metals, magnesium, calcium, and barium (U.S. Pat. Nos. 3,756,850 and 3,808,037). These patents do not discuss the inhibition of tannin migration through a film-forming finish on the wood substrate. The atinctorial deposit of a particulate base is used to maintain the freshly cut appearance of the lumber by maintaining the pH of the exposed surface of the lumber above about 10 for the duration of exposure to the atmosphere.

The paint, varnish and lacquer industry is still seeking an ecologically safe, effective stain-controlling agent for use under or in film-forming finishes. The variety of materials offered for the purpose is, to some extent, evidence that none is without disadvantage. Some of the materials identified by the prior art are very effective in complexing with tannins and preventing staining of top coats, but they cause discolored or tan primer coats. Thus it is also desirable to find an additive which can be incorporated into either the primer or top coats without discoloration.

As a consequence of its ability to complex with the natural dyes (i.e., tannins) magnesium hydroxide pigment used as an extender in primer coats, can prevent the staining of finish coats applied over tannin-containing wood substrates. Magnesium hydroxide is ecologically safe and does not cause discoloration in the primer coat.

SUMMARY OF THE INVENTION

The undesirable staining of film-forming finish coats caused by the migration of tannin from tannin-containing wood substrates is prevented by the application, prior to or concurrently with the film-forming finish, of an aqueous solution containing a stain-inhibiting amount of magnesium hydroxide having a high surface area. The aqueous formulation of magnesium hydroxide forms a leach-resistant, insoluble magnesium hydroxide-tannin complex at the wood/film interface, thus inhibiting the tannin migration into the finish coat. Effective stain control requires about 1 to 20 weight percent of magnesium hydroxide pigment based on total weight of the solvent system. It is preferred that the magnesium hydroxide have a surface area from about 50 to about 300 square meters per gram.

DETAILED DESCRIPTION OF THE INVENTION

Finely divided particles of magnesium hydroxide, $Mg(OH)_2$, are dissolved in an aqueous medium and the solution is applied to wood to be coated with a film-forming finish.

Magnesium hydroxide is well-known and commercially available. In a preferred embodiment the magnesium hydroxide is refined to a point where it has a very high surface area of at least 50 square meters per gram, the most preferred surface area being from 150 to 300 square meters per gram.

The aqueous medium may be water alone or it may be an aqueous solution or dispersion containing other materials. In a preferred mode of practicing the invention, the magnesium hydroxide compound is added to a latex primer paint. While this mode may not have the maximum efficiency in contributing hiding power to the top coat or coats, it is highly effective in inhibiting the bleeding of the stain beyond the primer coat into the top coat or coats.

The concentration of magnesium hydroxide in a formulation and the amount of the formulation applied may vary widely, depending on the type of wood to be treated and the degree of stain inhibition required. It is usually satisfactory to use magnesium hydroxide in a concentration of about 1 to about 20 percent by weight, preferably from about 1 to about 10 percent by weight based on the total weight of the solvent system. Effective stain-control results when the $Mg(OH)_2$ formulation is applied in a sufficient amount of thoroughly wet the surface of the wood. The magnesium hydroxide formulation can be applied to the wood substrate by any conventional means, e.g., brushing, rolling, spraying, dipping, an impregnating process and the like.

It has been noted that the magnesium hydroxide not only inhibits staining but also improves fire- or flame-resistance. British Pat. No. 1,080,468 specifically discloses the use of magnesium hydroxide as a smoke-retardant component when finely divided magnesium hydroxide particles are introduced into substantially any type of coating composition. The teachings in the aforesaid patent are incorporated herein by reference. The other known additives for stain control are not known to impart improved fire-retardancy. For this reason, coating compositions containing magnesium hydroxide have improved properties even when applied to nonstaining woods or to non-wood surfaces.

The preferred mode of practice in the invention is to add the magnesium hydroxide formulation to the film-forming finish that is to be used in coating wood that tends to stain top coat paints. Substantially any water-based film-forming coating that is useful on wood surfaces can be used, the most common types being those based on polymeric esters of acrylic and/or methacrylic acid or on polyvinyl acetate. Magnesium hydroxide is compatible with such coatings and can be added directly thereto, preferably in the form of an aqueous solution.

By the term "tannin-containing wood substrate" is intended to include wood, wood composites and wood-derived products containing water-soluble tannins. Tannins are highly water-soluble hydroxy- and carboxy-substituted benzene ring oligomers which occur in red oak, redwood, red cedar, mahogany and in many of the leaf, bark and root materials. Any wood substrate capable of receiving an application of an aqueous magnesium hydroxide formulation can be used in the practice of this invention. Typical examples include wood, wood composites, such as particle and fiber board and plywoods; and wood-derived products, such as veneer and paper.

The following non-limiting examples illustrate the practice of the invention. Unless otherwise specified, parts and percentages are by weight.

Redwood siding lumber was used as the tannin-containing wood substrate. Since tannin migration varies from sample board to sample board, comparative tests were usually made on samples of the same board.

EXAMPLE 1

A commercial white, acrylic latex paint was diluted one to one with water and portions were mixed with 2, 4, 6, 8, and 10 percent by weight of a high surface area (150 $m^2$/gm) magnesium hydroxide pigment. The mixtures were blended and cast, with a casting bar to control the thickness, at a 10 mil thickness on a redwood panel. For comparison, a 10 mil layer of diluted paint containing no magnesium hydroxide was also cast on the same panel. After allowing the cast primer coats to dry overnight, a top coat of diluted paint was then brushed at right angles to the primer coats. After drying, visual observation showed that the use of magnesium hydroxide in the primer coat caused a significant increase in the whiteness of the final coat of paint. Measurements of yellowness and whiteness with a Hunter Reflectometer showed that latex primer coats containing magnesium hydroxide can prevent extractive staining of the latex paint. The effectiveness of the magnesium hydroxide in this application appears to increase with the increased magnesium hydroxide surface area.

EXAMPLES 2-3

In each example, three redwood siding boards were used as wood substrates. Two boards were given a primer coat containing magnesium hydroxide as a stain-inhibiting agent; one board was used as a control (i.e., treated with a primer coat void of any substance known to inhibit tannin migration in the wood substrate).

The primer coats containing magnesium hydroxide were prepared as follows. Using a mortar and pestle, 50 parts of a commercial, white, exterior acrylate house paint (K-65) were mixed independently with 5 parts and 10 parts of magnesium hydroxide, respectively. Two modified samples were produced, NPC-1938-77B, having 10 percent $Mg(OH)_2$ modification and NPC-1938-77C, having 20 percent $Mg(OH)_2$ modification. The two modified samples (hereinafter referred to as 77B and 77C) and the control sample were separately cast onto redwood siding at a thickness of 10 mils. Sample 77C was fairly viscous. The three cast primer coats were allowed to dry overnight before a top coat of unmodified K-65 was then brushed at right angles to the three primer coats as indicated in Table 1. After various drying or aging intervals, the whiteness (W) and yellowness (Y) values for the experimental coatings were determined from the intensity of green (G) and blue (B) light reflected off the painted surfaces. A Hunter Lab Reflectometer was used to determine these values by measuring the intensity of the blue (B) and green (G) reflectances according to the formula:

$$Y = G - B$$

$$W = 4B - 3G.$$

The greater the W value and/or the lesser the Y value, the more tannin migration has been inhibited and vice versa. The Reflectometer and its operation is described more fully by H. S. Hunter in "New Reflectometer and Its Use for Whiteness Measurements", *J. Opt. Soc. Am.*, 50, 44 (1960).

The whiteness and yellowness values, reported in Table 1, can also be seen by visual observation. It is observed that in comparison with the control panel, higher whiteness values and lower yellowness values were achieved by using magnesium hydroxide in the primer coat. Further, it appears that at least about 10 percent $Mg(OH)_2$ and preferably 20 percent $Mg(OH)_2$ based on total weight of the solvent system is required for good stain control.

TABLE 1

Effect of $Mg(OH)_2$ on the Whiteness (W) and Yellowness (Y) of Primer and Top Coats

| Example No. | Reflections | Primer Coat NPC-1938-77B | Primer Coat NPC-1938-77C | Primer Coat K-65 Control | Drying or Aging Interval |
|---|---|---|---|---|---|
| 2 | Y | 4.6 | 4.6 | 5.9 | Under ambient conditions for three days |
| | W | 56.9 | 59.2 | 54.2 | |
| | | Acrylic Top Coat K-65 | | | |
| | Y | 4.2 | 4.4 | 4.8 | |
| | W | 65.7 | 65.3 | 61.9 | |
| 3 | Y | 4.4 | 5.2 | 6.1 | Aging for two weeks |
| | W | 58.0 | 55.6 | 51.5 | |
| | | Acrylic Top Coat K-65 | | | |
| | Y | 3.5 | 3.5 | 4.8 | |
| | W | 67.6 | 69.1 | 60.8 | |

EXAMPLE 4

Comparison of $Mg(OH)_2$ Modified Primer Paint with a Commercial Oil-based Primer Using the procedure of Example 2, redwood substrates were treated with three different primer coat compositions.

The primer coats had the following designations and compositions.

(1) NPC-1938-74A
10.0 parts titanium dioxide
0.5 parts Igepal CO630
0.5 parts Dow Corning "C" defoamer
6.0 parts of 2.5 weight percent 65H64000 cps Methocel
8.0 parts deionized water
20.0 parts of NPC-1837-69 anionic latex
(2) NPC-1938-76A Same as 74A above except 2.0 parts of Magnesium hydroxide were substituted for 2.0 parts of the titanium dioxide.

(3) Tru-Test No. 208 oil-based primer, manufactured by General Paint and Chemical Company, Division of Cotter and Company. Chicago, Illinois 60614.

The experimental primer coat compositions, hereinafter referred to as 74A and 76A, were prepared by grinding the components in a mortar and pestle as described in Example 2. Smooth, fluid paints were obtained, the magnesium hydroxide pigments being easily dispersible.

Samples 74A, 76A and the oil-base primer paint were cast onto redwood siding at a thickness of 10 mils. After drying overnight, Tru-Test K-65 acrylate paint is then brushed on at right angles to the three primer coats. After drying for three days, under ambient conditions, the whiteness and yellowness values are determined for the primer-coated and the top-coated areas. The results of the measurements are shown in Table 2.

From visual inspection and the measurements taken by the Hunter Lab Reflectometer, it is apparent that magnesium hydroxide has resulted in decreased yellowness and improved whiteness, indicating the inhibition of tannin migration into the film-forming finish. Substitution of magnesium hydroxide for titanium dioxide did result in decreased hiding power which would be very desirable in certain applications.

TABLE 2

| | $TiO_2$, $Mg(OH)_2$ Modified Primers vs. Oil-based Primer | | | |
|---|---|---|---|---|
| | Primer Coat | | | |
| Reflections | 74A | 76A | Tru-Test No. 208 | Drying Interval |
| Y | 7.3 | 6.0 | 4.4 | |
| W | 48.7 | 55.8 | 71.2 | |
| | Acrylic Top Coat | | | 3 days |
| Y | 4.0 | 3.6 | 3.6 | |
| W | 67.0 | 68.5 | 69.3 | |

What is claimed is:

1. The process of inhibiting the staining of a film-forming finish applied to a tannin-containing wood substrate which comprises the step of applying to the wood substrate, prior to or concurrently with the film-forming finish, a latex primer paint containing from about 1.0 to about 20.0 weight percent of magnesium hydroxide based on the total weight of the solvent system, said magnesium hydroxide having a surface area of at least 50 square meters per gram, thereby forming a leach-resistant magnesium hydroxide-tannin complex.

2. The process of claim 1 wherein the magnesium hydroxide has a surface area of from 50 to 300 square meters per gram.

3. The process of claim 1 wherein the magnesium hydroxide is dissolved in the film-forming finish.

4. The process of claim 1 wherein the aqueous formulation of magnesium hydroxide and the film-forming finish are blended to form a uniform mixture prior to their application to the wood surface.

5. The process of claim 1 wherein the wood substrate is redwood, cedar or mahogany.

6. The process of claim 1 wherein the film-forming finish is a latex primer paint.

* * * * *